Sept. 23, 1958 L. W. HUTCHINS 2,852,977
COLOR COPY CAMERA CONSTRUCTION
Filed July 19, 1955 4 Sheets-Sheet 1

INVENTOR.
LOREN W. HUTCHINS.
BY
Robert A. Sloman
ATTORNEY

Sept. 23, 1958    L. W. HUTCHINS    2,852,977
COLOR COPY CAMERA CONSTRUCTION
Filed July 19, 1955    4 Sheets-Sheet 2

INVENTOR.
LOREN W. HUTCHINS
BY
Robert A. Sloman
ATTORNEY

Sept. 23, 1958    L. W. HUTCHINS    2,852,977
COLOR COPY CAMERA CONSTRUCTION
Filed July 19, 1955    4 Sheets-Sheet 3
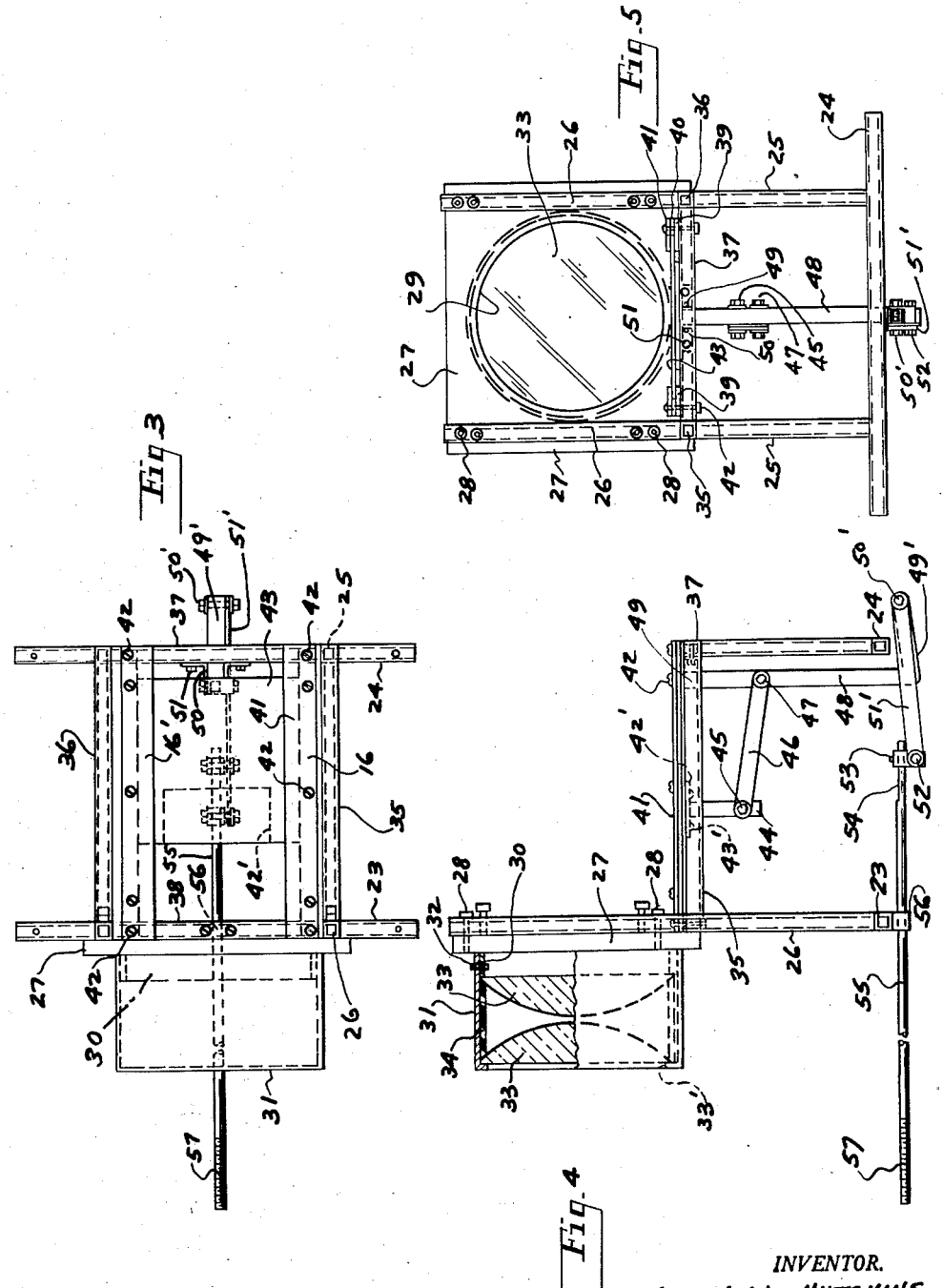
INVENTOR.
LOREN W. HUTCHINS.
BY
Robert A. Sloman
ATTORNEY.

Sept. 23, 1958 L. W. HUTCHINS 2,852,977
COLOR COPY CAMERA CONSTRUCTION
Filed July 19, 1955 4 Sheets-Sheet 4
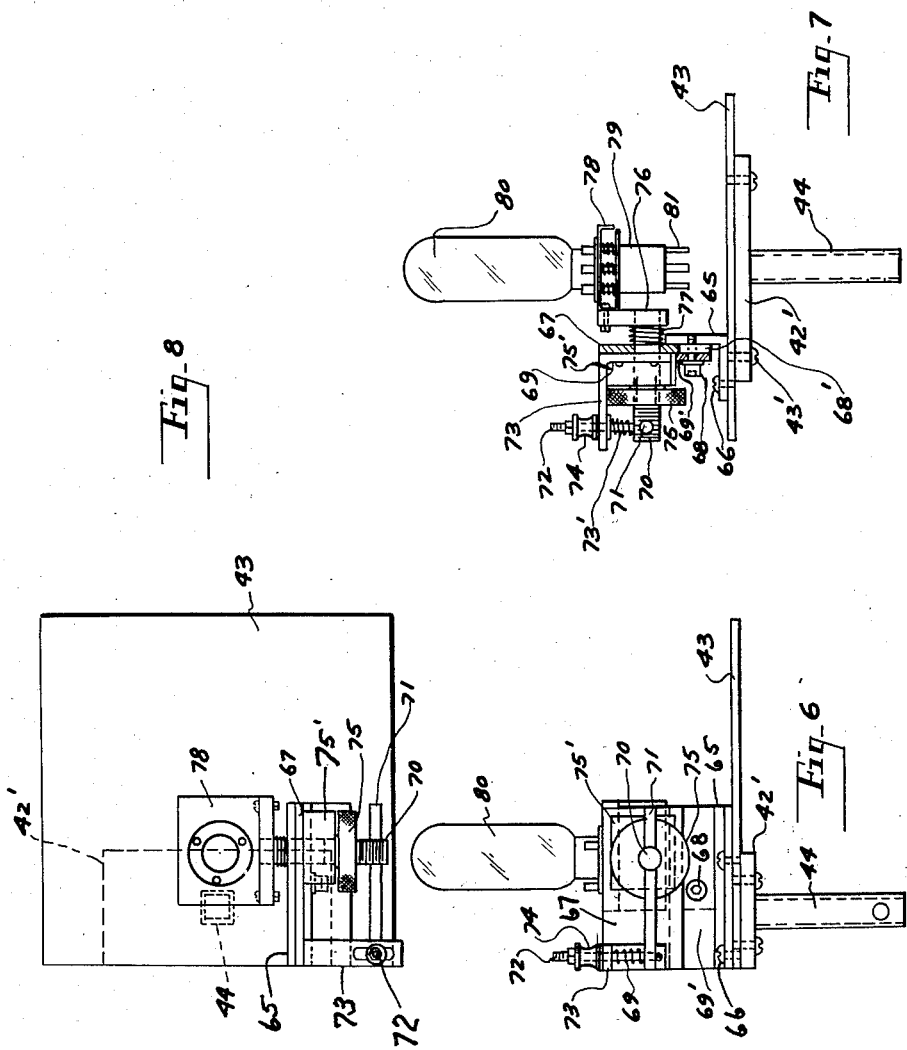
INVENTOR.
LOREN W. HUTCHINS
BY
Robert A. Sloman
ATTORNEY

United States Patent Office 2,852,977
Patented Sept. 23, 1958

2,852,977

COLOR COPY CAMERA CONSTRUCTION

Loren W. Hutchins, Detroit, Mich., assignor to The Douthitt Corporation, Detroit, Mich., a corporation of Michigan Application July 19, 1955, Serial No. 522,999

1 Claim. (Cl. 88—24)

This invention relates to cameras and more particularly to a three-color process camera.

It is the object of the present invention to provide a novel camera construction whereby three-color plates may be made for printing purposes from a three-color transparency which is mounted within the camera and the image of which is projected through the camera lens upon the sensitized film receptive to a particular color, as for example, green, red and blue.

Heretofore, in cameras of this type, the size of the picture involved, determined the size of lens to be employed and accordingly, with each change in lens size, new adjustments were required of the lens holder with respect to the light condenser within the camera. Accordingly, there was also required adjustments of the transparency holder and which is interposed between the lens holder and the condenser corresponding to the particular lens employed. These various adjustments often required changing of the light source upon the opposite side of the condenser and also for effecting independent adjustments of the light with respect to the condenser to thereby obtain a proper focus for a particular lens and for a particular adjustment of the lens holder.

In other words, for all of these adjustments, unnecessary time and labor were required additionally in changing the size of the condenser, changing the position of the light, and effecting these adjustments of the light.

The present invention has for its primary object the use of a single and stationary and fixed condenser in conjunction with a single light source.

It is the further object of the present invention to provide in conjunction with the manual adjustments of the lens holder of the camera mechanism means for effecting an automatic adjustment of the light source with respect to the condenser so that once the lens has been properly located there will have been an automatic relocation of the light source with respect to the single condenser.

It is the further object of the present invention to provide a light source carried upon the lens holder whereby masking film may be exposed in conjunction with the color transparency by projecting the light source back into the camera body through the lens of the camera.

It is the further object of the present invention to provide a novel mounting structure for the light source within the body of the camera and with respect to the condenser whereby in initially setting up the light it may be adjusted universally in any direction with respect to the condenser for proper initial location.

These and other objects will be seen from the following specification and claim in conjunction with the appended drawings in which:

Fig. 3 is a plan view of the supporting structure for the condenser and light with the enclosing casing of the camera removed.

Fig. 4 is a side elevational view thereof, partially sectioned for illustration.

Fig. 5 is a rear elevational view thereof.

Fig. 6 is a side elevational view of the light mounting, as shown in Fig. 2.

Fig. 7 is a right side elevational view thereof; and

Fig. 8 is a plan view thereof.

It will be understood that the above drawing illustrates merely a preferred embodiment of the invention and that other embodiments are contemplated within the scope of the claim hereafter set forth.

Figure 1:
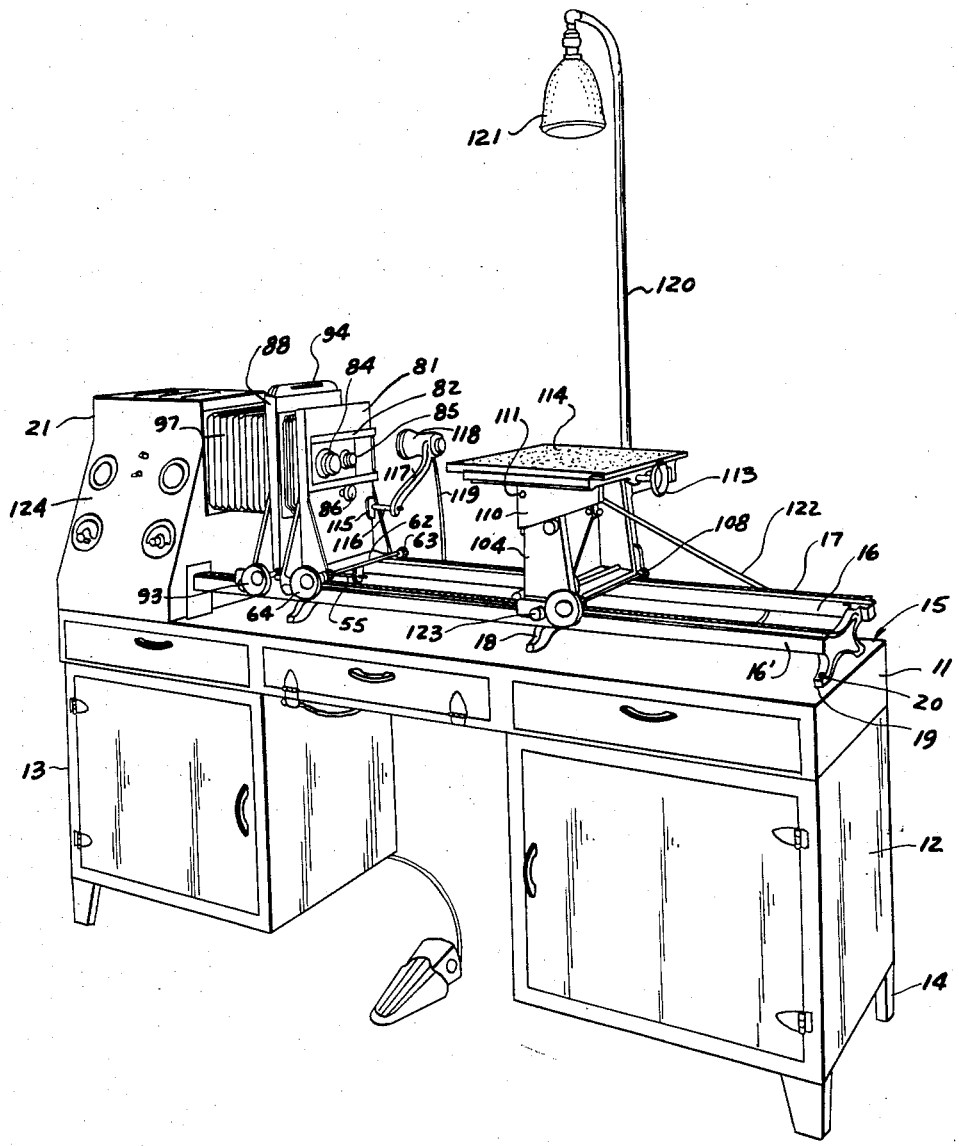
Fig. 1 is a front perspective view of the complete three-color process camera.
Figure 2:
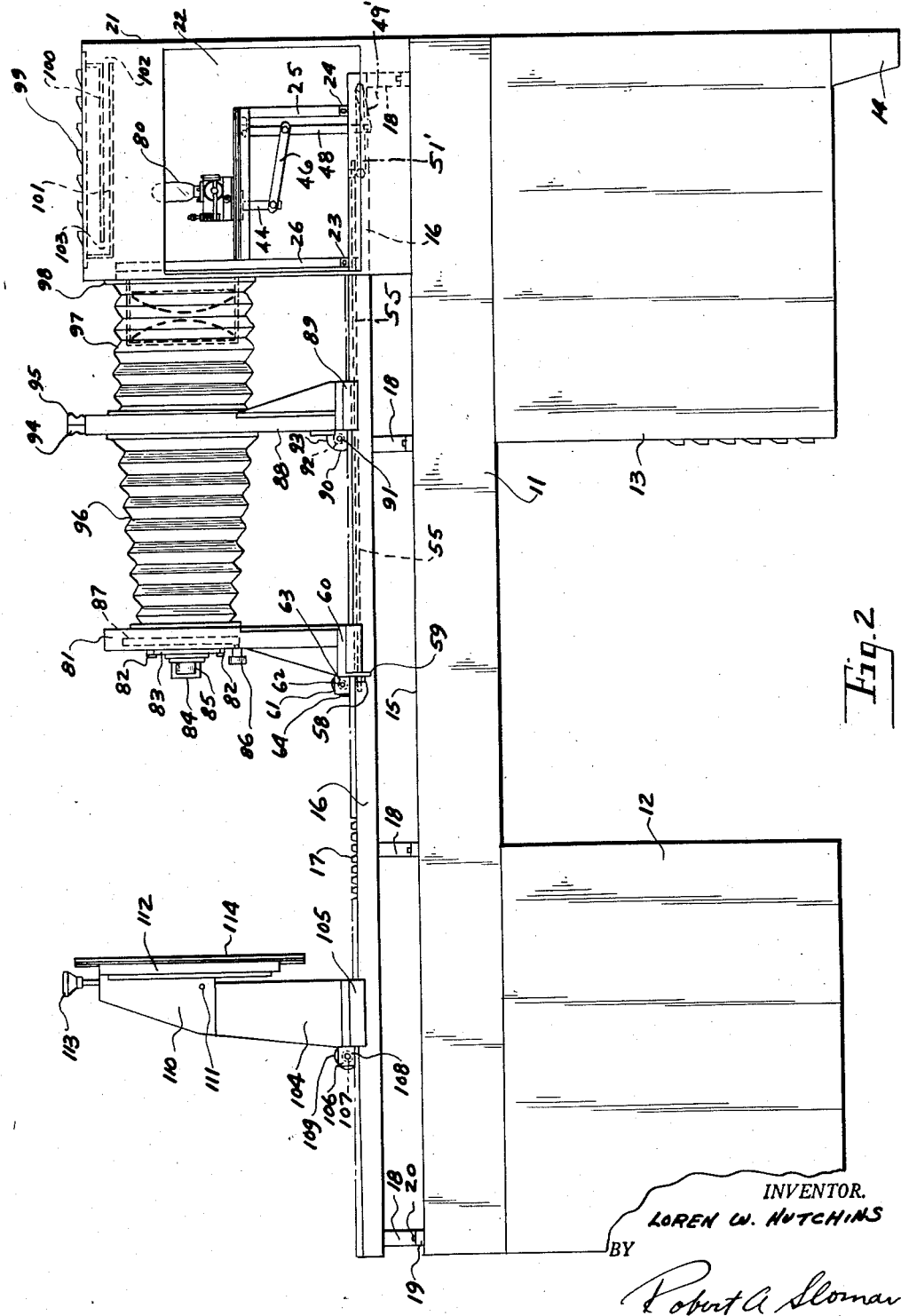
Fig. 2 is a rear elevational view thereof.

Referring to Figs. 1 and 2, the present camera includes the bed 11 and the cabinet elements 12 and 13, which are supportably arranged thereunder and which are provided with the corner legs 14. The top surface 15 of the bed has positioned thereon a series of longitudinally spaced transverse mounting brackets 18, whose legs 19 are secured by fasteners 20 to the top surface of said bed.

The casing 21 forms enclosure for the light source for the camera, as well as the mounting for the condenser and a portion of the camera bellows 97, said casing having an inlet opening 22 on one side thereof which is adapted to be closed by a suitable plate not shown.

Referring now to Figs. 3, 4 and 5, there is shown a detail construction of the mounting structure for the camera condenser and light source, and which includes the transverse tubular supports 23 and 24 in longitudinally spaced relation and which are preferably of square cross-section. These supports bridge the two parallel spaced ways or guides 16 and 16′ which extend substantially throughout the length of the bed 11 and which are suitably secured upon the mounting brackets 18. The upper surfaces of the ways 16 have secured thereon the continuous rack gears 17 which extend to the outside of housing 21.

Inwardly of the ends of support 23 there are provided a pair of parallel spaced upright tubular elements 26 which are suitably secured as by welding to support 23 and at their upper ends have secured forwardly thereof the mounting plate 27 as by the screws 28, which plate has a central circular aperture 29 to permit the transmitting of light to the condenser housing 31. Annular flange 30 is mounted upon the forward side of plate 27 and is adapted to supportably receive the annular outer edge of the condenser housing 31 and which is secured thereto as by the fasteners 32.

The housing 31 is apertured in its front wall at 33′ and has mounted therein in opposed relation a pair of upright condenser lenses 33 which are maintained in spaced relation by the annular, preferably rubber, lining 34 upon the interior of the cylindrical housing 31. The positioning of housing 31 on flange 30 effectively secures the condensers in the upright position shown in Fig. 4.

Towards the rear end of the frame structure and mounted upon transverse support 24 are a pair of tubular uprights 25 in longitudinal registry with the respective uprights 26, the lower ends of said uprights being suitably secured as by welding to support 24. The upper ends of supports 25 are interconnected by the horizontal tubular support 37 as by welding. Intermediate portions of the uprights supports 26 are similarly interconnected by the corresponding transverse support 38 which is in horizontal registry with support 37 and which is secured as by welding to the uprights 26.

The uprights 25 and 26 upon opposite sides of the support are interconnected by the elongated tubular supports 35 and 36 which are arranged in parallel spaced relation and which are suitably secured as by welding to thereby provide the frame structure for the light mounting, as well as the condenser support.

Bridging the transverse supports 37 and 38 are a series of opposed plates which include bottom plates 39, spacers 40, and top plates 41, which provide gibs for the longitudinally reciprocal plate 43, which is the plate upon which the light source is mounted in the manner hereafter described, said gibs being secured respectively to the cross supports 37 and 38 as by the bolts 42.

Plate 42' is secured to a central under surface portion of plate 43 as by the fasteners 43', Fig. 4. Centrally depending from plate 42' is the upright post 44 by which longitudinal adjustments of light mounting plate 43 may be effected automatically in the manner hereafter described.

Link 46 at one end is pivotally connected at 45 to arm 44 adjacent its lower end. The opposite end of link 46 is pivoted at 47 to the upright lever 48 whose upper end is pivoted at 49 between the brackets 50 secured at 51 to a portion of the frame construction.

The lower end of lever 48 terminates in the rearwardly extending and slightly upwardly extending arm 49', whose end is pivotally connected at 50' to the substantially horizontal link 51'. The forward end of link 51' is pivotally connected at 52 to the collar 53 which is adjustably secured to the reduced end 54 of the control shaft 55.

Said shaft extends centrally beneath the central portion of plate 43 and is guidably and supportably mounted through the bearing 56 which is centrally arranged upon the under surface of support 23. Rod 55 terminates in the threaded end portion 57 which, as shown in Fig. 2, is secured by the bolt 58 to the depending flange 59 on the lens support 60, mounted upon the ways 16 and 16'.

The lens support includes a pair of upright spaced bracket elements 61 through which the journaled shaft 62 has secured thereto a pair of spaced pinions 63 in mesh with the rack gears 17 on the two ways.

The forward end of shaft 62 has a handle 64 whereby the lens support 60 and the upright portion 81 thereof may be longitudinally adjusted over the ways as desired.

Arranged upon the front surface of lens support 60—81 there are provided a pair of parallel spaced transversely arranged gibs 82 within which is slidably positioned the lens mounting turret or plate 83 and which carries a relatively large lens 84, for example, 162 mm. and also a smaller lens 85, for example 101 mm. The turret 83 is so positioned between the gibs 82 and the end portions forming a part of upright 81 that when one end of the turret engages a corresponding end wall, one lens will be in correct central alignment with the axis of the condenser. Also, when the turret is slid to the limit of its movement in the opposite direction the other lens will be in proper registry. Suitable adjustable stops may be employed to control the accurate positioning of the turret 83 and accordingly the lenses 84 and 85.

A small hand knob 86 projects forwardly of lens support 81 and is joined upon the interior of said support to the filter turret 87 shown in dotted lines and which carries three-color filters, namely, green, red and blue. Manual rotation of handle 86 may thus selectively position any of the three filters into proper registry with the lens employed.

Slidably positioned transversely upon ways 16 is the upright transparency support 88—89 which is guidably positioned over said ways and which also includes a pair of brackets 90 in spaced relation for journalling shaft 91 which carries spaced pinions 92 in mesh with the respective rack gears 17 on the ways. Said shaft also has an operating handle 93.

In the present preferred embodiment of the invention the transparency support 88—98 is longitudinally adjustable upon the ways; and in accordance with the particular lenses employed there are provided suitable stops in conjunction with the ways to positively limit the manual adjustment of the transparency support depending upon whether a small or large lens is used.

For example, in Figure 1 the smaller lens is used and the transparency support has been moved forwardly to the position shown. In Figure 2 the larger lens is being used and in that case the transparency support has been moved rearwardly of the lens holder to a suitable stop. In other words, the correct positioning of the transparency holder may be predetermined, depending upon the size and focus of the lenses 84 and 85 which may be employed.

The transparency support 88 is hollow and is adapted to removably receive therein a pair of upright transparency holders 94 and 95, preferably of a plastic construction, and which are hinged together at their lower ends and which are transversely apertured and are adapted to receive therebetween at a central portion thereof the particular color transparency from which plates are to be made. Said transparency used in three-color process printing hereafter described is so supported as to be in axial registry with the lens used. These plates thus provide means for mounting the transparency in the camera and for adjusting the same with respect to the condenser, as well as the lens holder.

The conventional bellows 96 interconnects lens support 81 and transparency support 88 and is arranged coaxially of the lens axis, as well as the condenser axis. A second bellows is interposed between transparency support 88 and casing 21 and is secured to the said casing as at point 98. Correspondingly, the respective other ends of the said bellows are secured to the above mentioned lens and transparency supports for movement in unison therewith in a conventional manner.

Referring to Fig. 2, the top wall of the casing has a series of louvres 99 to permit the introduction of ventilating air into the chamber for the light source 80. There is provided directly beneath said louvres and spaced therefrom the two baffle plates 100 and 101, which are arranged in spaced relation and which depend from the top wall and thus provide passages 102 and 103 to permit the circulation of ventilating air, but at the same time prevent the loss of light through the said louvres.

There is also mounted upon the ways 16 an upright vacuumboard or screen and film holder 104 with support element 105 which guidably engages the ways 16. Transverse spaced brackets 106 journal shaft 107 which carries the spaced pinions 108 in mesh with the rack gears 17 on the ways and under the operation of handle 109 provide for longitudinal adjustments of said vacuumboard holder 104.

Mounting plate 110 is pivotally connected to support 104 at point 11 whereby plate 110 may be swiveled to the horizontal position shown in Fig. 1. Plate 110 carries the longitudinally adjustable vacuumboard or screen and film holder 114. This vacuumboard may be adjusted longitudinaly with respect to plate 110 as by the manual control 113 which is in the nature of a screw.

The said vacuumboard 114 includes a housing 112 which is adapted for connection with a source of vacuum as by hose 122 of Fig. 1. The housing is covered by a plate 114 which is perforated throughout and over which the sensitized film will be positioned for exposure for a particular color. In other words, a film which will be for either green, red, or blue. A suitable screen is also mounted over the completed assembly and over the negative film employed for the photographing operation.

Referring to Fig. 1, there is mounted at 115 upon lens support 81 a horizontally disposed support arm 116 which carries the swing arm 117 and which is journaled thereon and at its outer end mounts a light source 118 with a suitable electrical connection 119 to permit energization as desired.

As an initial step in the printing process it is necessary to provide a color correcting mask to be used in conjunction with the photographing of the transparency. For this purpose the camera is initially set up with the color transparency to be employed in place within the transparency supports 95 and 94. There is also applied a sensitized masking film in direct registry with and between the said plates and which is mounted upon conventional locating pins in such a way that after the film has been processed it may be returned to its initial position for use in the manner hereafter described.

The said light source 118 as mounted on its arm 117 swings into axial registry with the particular lens employed so that the light is directed through the camera lens to expose the masking film, after which the arm 117 may be swung to the position shown in Fig. 1.

There is also provided upon the vacuumboard support the upright standard 120 which carries at its upper end the downturned source of light 121 with suitable electrical connections employed in conjunction with a timer mechanism on the control panel 124 of the camera to thereby obtain an initial hardening of the dots formed on the exposed sensitized film, which has been turned to a horizontal position in the manner illustrated in Fig. 1.

As shown in Fig. 1, in conjunction with each of the supports 60, 89 and 105, respectively, there are provided lock screws 123 whereby the particular support may be secured with respect to the guide 16' against accidental displacement once it has been properly adjusted.

Referring now to Figs. 6, 7 and 8, there is shown a specific mounting for the light 80 whereby universal adjustments thereof may be obtained in initial setting up of the light within casing 21 and upon its support plate 43.

For this purpose there is provided the upright angle member 65 secured at 66 to plate 43.

Upright support plate 67 registers against the upright portion of angle member 65 and is provided with an enlarged slot 68' at its lower end through which extends the securing bolt 68, said bolt extending through the outer mounting plate 69', through said slot and threadedly into angle member 65. By this construction the upright support plate 67 may be adjusted in any direction throughout 360 degrees in view of the enlarged slot 68', after which the plate is secured in position by the bolt 68. Plate 67 has secured in its front face the mounting block 75' which is transversely apertured to loosely receive therethrough the shaft 70, the outer end of which is secured as at 76 to the light mounting bracket. Shaft 70 is threaded throughout a portion of its length and threadedly receives the operating wheel 75 which bears against block 75' and cooperates with the coiled spring 77 which is loosely mounted upon shaft 70 between support 67 and light mounting bracket attachment 76. Accordingly, rotation of hand wheel 75 in one direction or the other will provide transverse adjustments of the light support 76 and the light 80.

There is also secured at one end of plate 67 the angle member 69 which has a horizontally arranged portion 73 which is apertured at its end to receive the upright bolt 72. Said bolt has a right angularly related portion 71 at its lower end which extends transversely through shaft 70 to retain said shaft against rotation. Accordingly, rotation of wheel 75 will effect longitudinal adjustments of shaft 70 and accordingly provide for crosswise adjustments of the bulb 80.

Shaft 72 at its upper end is threaded and receives the adjusting nut 74 which cooperates with the angle member 73, as well as the coiled spring 73' whereby on manual adjustment of nut 74 the arm 71 will be angularly adjusted and accordingly the light 80 may be swung in an arc to the extent that this may be necessary, correctly setting up the light with respect to the longitudinal axis of the condenser.

The light support includes the horizontally arranged socket member 78 which supportedly receives the base 79 of the light 80, there being the conventional connecting prongs 81 by which electrical energy may be brought to the light.

*Operation*

After the color correction mask has been exposed and thereafter been processed for use, the camera is then ready to be used in conjunction with a three-color process for printing. Three independent separation negatives are made from the transparency. These negatives are made from sensitized film which has been exposed in the operation of the camera and wherein the said films have been separately exposed, one through the green filter, one through the red filter and one through the blue filter.

For example, if a small lens such as the 101 mm. lens is employed for projecting small transparency, the said lens 85 will be slid horizontally upon its turret 83 into registry with the longitudinal axis of the camera. The transparency holder will be moved forwardly to the position shown in Fig. 1 until it engages a suitable pre-set stop in conjunction with the ways 16 and 16'. It is then necessary to longitudinally adjust manually the screen and film holder or vacuum-holder support 105 with the light 80 energized and with the image projected upon the vacuumboard at 114, but without the sensitized film in place. The support 104 is adjusted to obtain a predetermined size of image, whichever is desired. At the same time the lens support 81 must be adjusted manually in order to achieve a correct focus from the light source through the condenser and through the lens and upon the objective surface 114. Adjustment of the lens support 81 is completed when the image appears perfectly clear upon the objective 114.

On the other hand, should it be desired to provide for a larger transparency, then the turret 83 will be shifted to place the larger lens 84 in correct registry; for example, 162 mm. lens. This necessitates a readjustment of the transparency holder 88 manually and it is moved rearwardly until it engages a positive stop which has been pre-set into a position such as shown in Fig. 2, for illustration. Thereafter the vacuumboard holder 104 is again adjusted for correct size of picture to be printed, and at the same time the lens holder is again adjusted for proper focus.

All of these adjustments of the lens holder heretofore required additional and numerous adjustments of the light source. For example, also for each lens there was required a different condenser so that condensers had to be changed, also the light.

The present invention contemplates an automatic control of the positioning of the light source 80 with respect to a single permanent condenser and wherein either of the lenses 84 and 85 may be employed.

By the linkage above described, which interconnects the lens holder as at point 58 with the adjustment mechanism for the light, there is a proportional adjustment of the light each time there is a longitudinal adjustment of the lens holder. For example, if the lens holder 81 is moved rearwardly 4 inches, there will be a corresponding rearward adjustment of the light approximately 1 inch. A preferred ratio of adjustment is approximately 4½ to 1. Furthermore, should the lens holder move forwardly 4 inches, there would be a proportioned automatic adjustment forwardly of the light 80.

This means that throughout the various adjustments of the lens holder which are normally required, as well as the adjustments of the transparency holder, in securing proper focus and proper size, there is no longer a need for any separate manual adjustment of the light source, as this is automatic. Furthermore, one condenser is employed instead of changing condensers for each size lens.

After the first step has been completed in preparing the necessary color correction mask and after this mask has been properly processed, it will be used in conjunction with the color transparency employed during the photographing operation for the three-color plates to be reproduced from the respective three sensitized films in the three-colors mentioned.

As an initial step, the filter holder turret is manually adjusted through the knob 86 so as to properly present a green filter. The sensitized film which will respond to green light is then properly positioned upon the vacuum filmholder in a conventional manner and arranged in an upright position as indicated in Fig. 2, it being assumed that all adjustments of the various supports have previously been made. The color transparency with the mask applied is then properly positioned within the transparency holder and there is an exposure by a temporary illumination of the light source 80 under a positive timing control for the required amount of time. The exposed negative on the filmholder 114 is then rotated to a horizontal position as indicated in Fig. 1 and there is a temporary illumination thereof by the flash lamp or other source of illumination 121 to harden the dots which have resulted from the exposure on the sensitized emulsion which forms a part of the film.

The process is then again repeated but with the color filter turret rotated by the knob 86 to present a red filter. Thereafter a proper film responsive to red light is positioned upon the filmholder 114 in the position shown in Fig. 2, and there will be a second exposure. This is followed by rotating the turret again for a blue color filter, and after applying sensitized film which responds to blue light upon the filmholder there will be a third exposure.

Thereafter, the three exposed film or sensitized sheets are properly processed and made into the proper color plates which may be used in a three-color printing operation.

Having described my invention, reference should now be had to the claim which follows for determining the scope thereof.

I claim:

In a projector having a bed, and a pair of elongated parallel spaced ways mounted thereon; a hollow casing at one end of the ways, a light condenser lens assembly mounted on the casing in light communication with its interior, an upright lens support including a lens movably mounted on said ways forwardly of the condenser, a horizontally reciprocable platform slidably mounted within and upon the casing mounting a source of light rearwardly of said condenser assembly, and a linkage interconnecting the lens support and said platform so that longitudinal adjustment of the lens support with respect to the condenser assembly effects a corresponding corrective and proportional adjustment of the light source relative to said condenser assembly, said linkage including a horizontally disposed rod secured at one end to said lens support, extending between and parallel to said ways, guide means on the bottom of the casing slidably receiving said rod, an arm depending from said platform, a cantilever pivotally suspended at one end upon said casing, the other end of said cantilever adjustably secured to the other end of the rod, and a horizontally translatable link with its opposite ends respectively connected pivotally to said arm and to the cantilever intermediate its ends.

References Cited in the file of this patent

UNITED STATES PATENTS

| | | |
|---|---|---|
| 2,135,575 | Hansch | Nov. 8, 1938 |
| 2,341,431 | Fairbanks | Feb. 8, 1944 |
| 2,425,863 | Carlson | Aug. 19, 1947 |
| 2,621,569 | Glassey | Dec. 16, 1952 |

FOREIGN PATENTS

| | | |
|---|---|---|
| 506,822 | Great Britain | Aug. 30, 1937 |